United States Patent
Moser et al.

(10) Patent No.: US 7,210,799 B2
(45) Date of Patent: May 1, 2007

(54) METHOD FOR PRODUCING A PLATE

(75) Inventors: Helmut Moser, Bruchsal (DE); Frank Gotthardt, Eisenach (DE)

(73) Assignee: Fer Fahrzeugelektrik GmbH, Eisenach (DE)

( * ) Notice: Subject to any disclaimer, the term of this patent is extended or adjusted under 35 U.S.C. 154(b) by 320 days.

(21) Appl. No.: 10/506,332

(22) PCT Filed: Jan. 23, 2003

(86) PCT No.: PCT/EP03/00679

§ 371 (c)(1),
(2), (4) Date: Sep. 2, 2004

(87) PCT Pub. No.: WO2004/048155

PCT Pub. Date: Jun. 10, 2004

(65) Prior Publication Data

US 2005/0150146 A1     Jul. 14, 2005

(30) Foreign Application Priority Data

Nov. 27, 2002   (DE) .............................. 102 55 377

(51) Int. Cl.
*G02B 5/12*   (2006.01)
*G09F 13/22*  (2006.01)
*G02F 19/00*  (2006.01)

(52) U.S. Cl. ...................... 359/520; 359/515; 359/548; 40/544; 40/615

(58) Field of Classification Search ..................... None
See application file for complete search history.

(56) References Cited

U.S. PATENT DOCUMENTS

| 4,457,089 A | 7/1984 | Phillips, Jr. |
| 6,111,696 A | 8/2000 | Allen et al. |
| 2005/0120605 A1* | 6/2005 | Fitzke et al. .................. 40/544 |

FOREIGN PATENT DOCUMENTS

| DE | 201 09 237 U1 | 9/2001 |
| DE | 200 22 563 U1 | 12/2001 |
| DE | 202 01 224    | 4/2002 |
| DE | 202 01 224 U1 | 5/2002 |
| DE | 101 51 188 A1 | 5/2003 |
| EP | 669 008 B1    | 11/1998 |
| WO | WO 02 23509   | 3/2002 |
| WO | WO 02/23509 A2 | 3/2002 |

* cited by examiner

*Primary Examiner*—James Phan
(74) *Attorney, Agent, or Firm*—Sughrue Mion, PLLC

(57) ABSTRACT

In a process for the production of a plate, in particular a motor vehicle licence plate, in which at least a layer sequence forming an electroluminescence flat capacitor (4, 5, 6, 7) and a reflection film (10; 10') are applied to a carrier (1), a reflection film (10; 10') is selected whose reflection value is higher than the maximum value permitted by statute, and said reflection value is reduced by further production steps to such an extent that it is below the maximum value permitted by statute.

11 Claims, 1 Drawing Sheet

METHOD FOR PRODUCING A PLATE

BACKGROUND OF THE INVENTION

The invention concerns a process for the production of a plate, in particular a motor vehicle licence plate, and plates produced in accordance with that process.

Reflective plates, in particular motor vehicle licence plates, are known from the state of the art, the reflectance of which is based on a reflection film being glued or laminated on to a carrier which for example comprises sheet aluminum. In that situation it is necessary to use reflection films whose reflectance is within a range which is fixed by statute and which establishes that the reflectance may not fall below a minimum value of that range or exceed a maximum value thereof. Commercially available films which satisfy those conditions include a carrier layer which frequently comprises aluminum and which is impenetrable for light.

If now the attempt is made to produce a plate, in particular a motor vehicle licence plate, which is self-illuminating by virtue of the fact that, on one of its flat sides, it has a layer sequence which forms an electroluminescence flat capacitor and which is constructed directly on the plate itself, then in accordance with the state of the art such a plate cannot be at the same time designed to be reflective. More specifically, if the layer sequence of the flat capacitor is firstly applied to the carrier, it cannot then be covered over with the above-mentioned reflection films as the carrier thereof does not transmit the light which it emits.

If conversely the attempt is made to apply a surface-covering electroluminescence flat capacitor arrangement to the top side of a reflection film applied to the plate carrier, the reflection properties thereof become ineffective as at least some of the flat capacitor layers are impenetrable in both directions in relation to external light.

Admittedly transparent reflection films are also available on the market, but they have a reflectance which is substantially higher than the above-mentioned maximum value which is permitted by statute.

SUMMARY OF THE INVENTION

In comparison therewith the object of the present invention is to provide a process of the kind set forth in the opening part of this specification, which makes it possible easily and inexpensively to produce plates, in particular motor vehicle licence plates, which have a reflectance complying with the statutory requirements and which at the same time carry an electroluminescence flat capacitor which covers at least the major part of the flat side thereof and which imparts self-illuminating properties thereto.

To attain that object, the invention provides the features recited in the appended claims.

Those features are based on the consideration that it is possible to apply both a layer sequence forming an electroluminescence flat or surface capacitor and also a reflective film to one and the same side of the carrier, if a reflection film is used, whose reflectance is initially higher than the maximum value permitted by statute, but that reflection foil is subjected to at least one manufacturing step which at least in location-wise manner reduces its reflectance to such an extent as to afford an average value which complies with the statutory requirements.

Basically, two different operating procedures are possible when carrying out the method according to the invention.

In one procedure firstly the reflective foil is applied to the carrier of the plate and, on the front side of said film which faces towards the person viewing it, there is constructed a rastered flat capacitor arrangement, the size and the surface density of the electrically conductingly interconnected raster points which are impermeable to external light being so selected that they cover a sufficient area of the reflection film to reduce the mean reflection value thereof to below the maximum value permitted by statute and at the same time form a sufficiently large area which lights up in operation to satisfy the statutory requirements in terms of brightness of a self-illuminating plate. It has surprisingly been found that such a choice in terms of size and surface density is possible. With this variant it is immaterial whether the reflection film has an opaque carrier layer or not.

In a more greatly preferred variant however firstly the layer sequence forming the flat capacitor is built up on the carrier of the plate and then covered over with a reflection film which from the outset is transparent or is made transparent in a location-wise manner, for the light emitted in operation by the flat capacitor.

In order to reduce the initially very high reflection value of such a film to bring it into the permissible range, a plurality of different process steps which are independent of each other or which can be used in conjunction with each other are available in accordance with the invention.

In accordance with a particularly preferred mode of operation a transparent reflection film, at the rear side of which prismatic structures freely project, at the interfaces of which the light incident from the front side is reflected by total reflection, is so connected to a layer which is applied to the top side of the flat capacitor and which preferably at the same time serves as an adhesive for the reflection film and which involves approximately the same refractive index as the prismatic structures of the reflection film, that the free spaces present between the projecting prismatic structures are at least partially filled by said layer. No further total reflection can then occur at all the interfaces of the prismatic structures which are covered by that layer. By virtue of the fact that not all interfaces of the prismatic structure are brought into contact with that layer, there is still a reflectance—although reduced—which can be controlled within wide limits and in particular in such a way that the statutory standards are satisfied, by virtue of the extent to which the prismatic structures are covered by the above-mentioned layer.

That extent can be specifically and targetedly influenced by virtue of the production process being of a suitable nature.

In accordance with another preferred process, a transparent reflection film is tempered, that is to say heated, either prior to or during the application to the uppermost layer of the flat capacitor or a transparent layer disposed thereover, and/or is pressed against a hard flat surface in such a way that the prismatic structures projecting at the rear side thereof are flattened off and thus there is a reduction in the surface regions of said structures, which implement total reflection. By virtue of suitable selection of the temperature and/or the pressing pressure as well as the treatment time, it is in turn possible to reduce the reflectance of the reflection film to such an extent that it is in the range permitted by statute.

A further preferred possibility involves applying a reflection film which is not transmissive in respect of the light of the electroluminescence flat capacitor on or over the electroluminescence flat capacitor which is provided with a raster pattern of holes in which the size and surface density of the through holes are so selected that the reduction implemented thereby in respect of the reflection value which is averaged in relation to surface area reduces same to below the permitted maximum value and at the same time affords adequate options for transmission of the light emitted by the flat capacitor in operation, in order to be able to satisfy the statutory brightness requirements.

The features of plates which are produced in accordance with one of the processes of the invention are set forth in the appended claims.

BRIEF DESCRIPTION OF THE DRAWING

The invention is described hereinafter by means of embodiments by way of example with reference to the drawing in which.

DETAILED DESCRIPTION OF THE INVENTION

Figure 1:
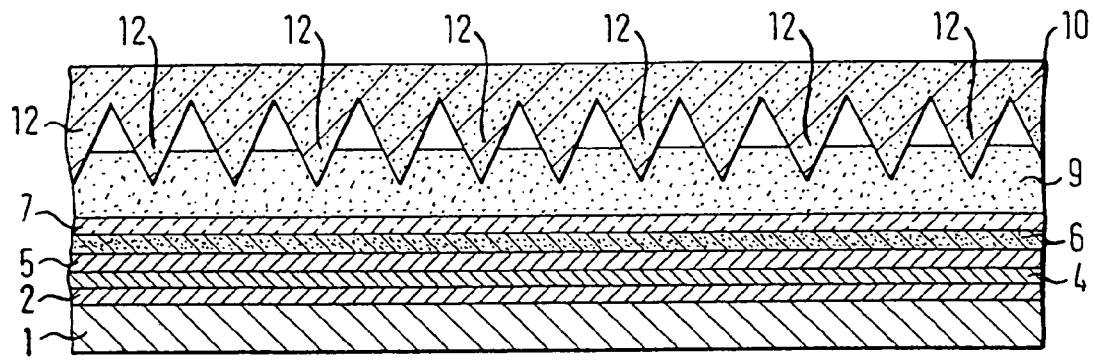
FIG. 1 shows a diagrammatic cross-section through a first embodiment of a plate according to the invention in which the degree of reflection of a transparent reflection film is reduced by partially immersing the prismatic structures projecting on the rear side in an adhesive layer having the same refractive index.

In all illustrated embodiments the thicknesses of the individual layers are not shown true to scale and in part, for the sake of simplicity, are illustrated on a greatly enlarged scale. The prismatic structures which project from the rear side of the reflection film or which are embedded into the reflection film and at the interfaces of which reflection of the light incident from the front, that is to say from above in the Figures, are shown in greatly simplified form as rearwardly projecting prisms of triangular or trapezoidal cross-section.

In the lower region all illustrated embodiments involve the same layer structure. Those layers which are the same in all of FIGS. 1 through 4 are denoted by the same references.

The basis of each plate is formed by a deformable carrier 1 which can comprise a plastically deformable plastic material or metal, for example aluminum. In the latter case the carrier 1 is preferably completely covered over by an insulating layer 2 which on its top side carries a metal coating which is a good electrical conductor, for example of copper, and out of which are etched various conducting regions of which the Figures show in cross-section only the region forming the base electrode 4 of the electroluminescence flat capacitor described hereinafter. If a plurality of mutually juxtaposed, separately actuable flat capacitors are to be provided on the plate, then a plurality of mutually electrically insulated base electrodes with their respective actuating lines can also be etched out of the metal coating. In addition, a feed-in line (not shown) for the transparent cover electrode of the flat capacitor or capacitors, said electrode being described in greater detail hereinafter, is also advantageously etched out of the metal coating in such a way that it is electrically insulated from the base electrode or electrodes and the actuating lines thereof.

Disposed over the metal coating is an insulating layer 5 which covers the entire surface of the base electrode 4 and which is preferably colored with a light pigment so that the light which is emitted rearwardly, that is to say downwardly in the Figures, by the pigment layer 6 disposed thereabove in operation of the flat capacitor is radiated as completely as possible forwardly. Disposed over the pigment layer is a transparent, extremely thin cover electrode 7 which however is a good electrical conductor and which, in at least one edge region (not shown in the Figures) in which the insulating layer 5 and the pigment layer 6 are omitted, is in good electrically conducting contact with the feed-in line which is produced from the metal coating so that an ac voltage can be applied by way of that feed-in line to the cover electrode 7 in relation to the base electrode 4, by virtue of which voltage the doped pigments contained in the pigment layer 6 are excited in known manner to produce a light referred to as electroluminescence.

The structures described hereinbefore can be produced by a procedure whereby a commercially available film which forms the insulating layer 2 and which is provided on its underside with an adhesive layer (not shown) and which on its top side carries the metal coating is glued or laminated on to the carrier 1. The operation of etching out the various, electrically mutually separated line and electrode regions can be effected as required prior to or after that operation of applying the plastic film to the carrier 1. The further layers 4 through 7 of the flat capacitor can be applied by known coating processes (spraying, screen printing, thick layer or other coating processes).

In the embodiment shown in FIG. 1, disposed over the transparent cover layer 7 is a comparatively thick adhesive layer 9 which is applied over the entire flat side of the plate and which serves for fixing the reflection film 10 disposed thereover. The adhesive used for the adhesive layer 9 at least in the hardened final condition has a refractive index which is substantially equal to the refractive index of the prismatic structures 12 projecting from the rear side of the reflection film 10. When applying the reflection film 10 it is pressed under a predetermined pressure in such a way that those prismatic structures 12 penetrate to a desired depth into the adhesive layer 9. For all light beams which impinge on the transparent reflection film 10 from the front, that is to say from above in the Figures, and which are propagated therethrough into the prismatic structures 12, no or only a greatly reduced level of total reflection occurs at the surface portions of the prismatic structures 12 which are covered by the adhesive of the adhesive layer 9, because of the equal or almost equal refractive indices; total reflection however is retained unreduced at the surface portions of the prismatic structures 12, which are not covered by adhesive. On average therefore that affords a reflectance on the part of the reflection film 10, which is reduced in comparison with the non-adhesive-coated condition thereof. The extent of the reduction in the reflectance depends on the depth of immersion of the prismatic structures 12 into the adhesive layer 9, which in turn can be controlled by the pressure exerted in the operation of applying the reflection film 10 and/or the viscosity of the adhesive which prevails at the time of applying the reflection film. It is thus possible to use a reflection film 10 which is very substantially transparent for the light of the flat capacitor or capacitors and which, prior to processing thereof, has a very high reflectance which is above the maximum value permitted by statute, that reflectance being reduced in a specific targeted fashion in production of the plate in such a way that it falls in the range which is permitted by statute.

Figure 2:
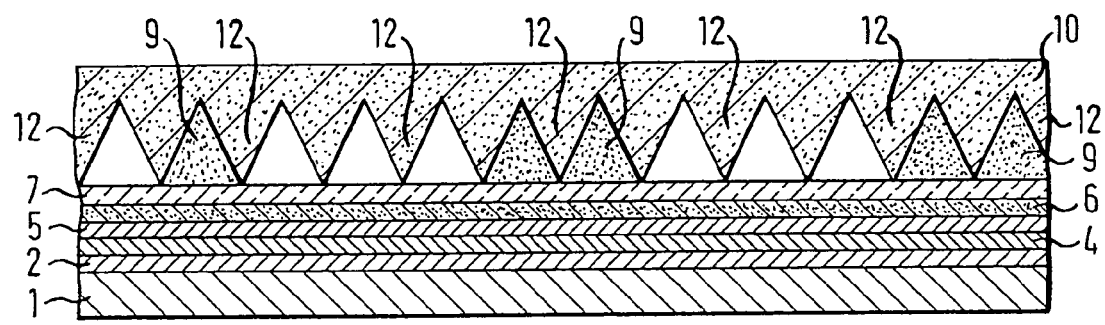
FIG. 2 shows a diagrammatic cross-section through a second embodiment of a plate according to the invention in which the degree of reflection of a transparent reflection film is reduced by completely immersing the prismatic structures projecting on the rear side in an adhesive layer which is only partially applied to the surface of the plate and having the same refractive index.

The embodiment shown in FIG. 2 only differs from that shown in FIG. 1 in that the adhesive layer 9 is not applied over the entire surface area but only partially to the top side of the transparent cover electrode 7 and that the prismatic structures 12 projecting at the rear side of the reflection film 10, in the surface regions in which there is an adhesive layer 9, are immersed completely into same so that the free spaces between them are entirely filled with adhesive. Therefore, no total reflection whatsoever takes place in those regions at the adhesive-covered surfaces of the prismatic structures 12. In contrast, in the surface regions in which there is no adhesive layer 9, the prismatic structures 12 retain their capability of total reflection to the full extent. Accordingly, by virtue of a suitable choice both of the size and also the distribution of the surface regions which are covered with an adhesive layer 9 and the adhesive-free surface regions disposed therebetween, it is possible to achieve a mean reflectance in respect of the reflection film 10, which is within the range permitted by statute, although the reflectance of the reflection film 10 before processing exceeds the maximum permissible limit value.

The adhesive layer 9 can be applied in different ways both in the embodiment of FIG. 1 and also in the embodiment shown in FIG. 2.

One possible way involves using a screen printing process which makes it possible quickly and reliably to implement both application over the entire surface area as shown in FIG. 1 and also the application limited to individual surface regions, with interposed adhesive-free surface regions, in an economical fashion.

Another process involves using a transfer film which is covered on one side with an adhesive layer or an adhesive pattern and which is pressed with that layer leading against the uppermost layer of the flat capacitor or a layer covering the flat capacitor in order to transfer the adhesive on to that layer. Thereafter, the transfer film is detached and the reflection film is applied.

Another possibility involves using an adhesive film which is coated with adhesive on both sides, wherein the adhesives on the two flat sides of the adhesive film can be the same or, adapted to the specific conditions involved, can be different from each other. Thus, particularly in the case shown in FIG. 2, the lower adhesive layer is distributed over the entire surface area while only individual surface elements are covered with adhesive on the top side of the adhesive film. The layer thicknesses of the adhesives on the two sides of the adhesive film can be the same or different from each other. Using the lower adhesive layer, the adhesive film is stuck on to the uppermost layer of the flat capacitor or a layer covering same, while the reflection film is glued on to the top side of the adhesive film. As the adhesive film remains in the layer structure of the plate, it must be transparent in relation to the light emitted by the flat capacitor in operation.

Figure 3:
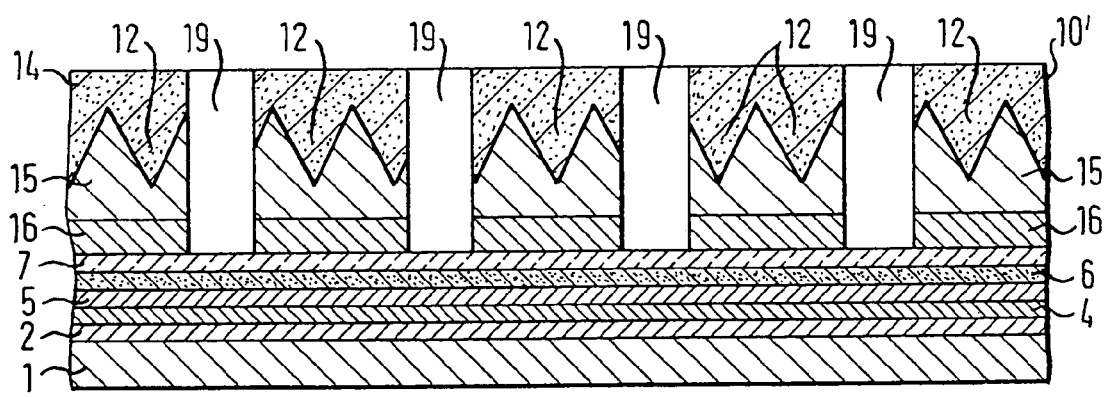
FIG. 3 shows a diagrammatic cross-section through a third embodiment of a plate according to the invention in which the degree of reflection of a reflection film having a non-transparent carrier is reduced by applying a grid raster of holes which pass through to the electroluminescence flat capacitor.
Figure 4:
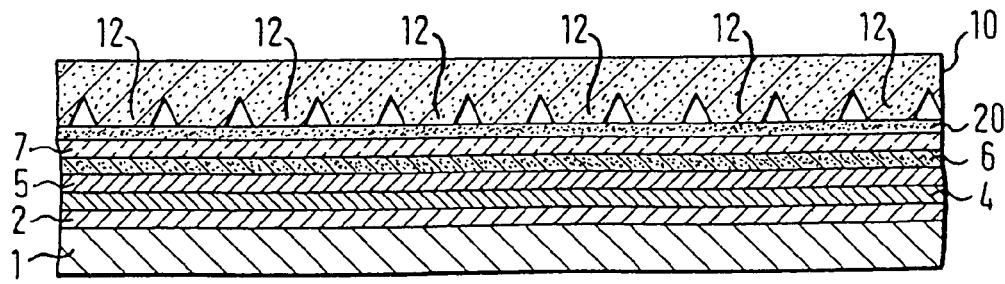
FIG. 4 shows a diagrammatic cross-section through a fourth embodiment of a plate according to the invention in which the degree of reflection of a transparent reflection film is reduced by flattening or rounding of the prismatic structures projecting on the rear side.

The embodiment shown in FIG. 3 uses a reflection film 10' which comprises three layers, namely a foremost transparent cover layer 14 which in turn includes prismatic structures 12 which are completely embedded into an intermediate layer 15 which is also transparent and the refractive index of which differs from that of the prismatic structures 12 so greatly that total reflection occurs at the interfaces. The reflection film 10' further includes a carrier layer 16 comprising a material which is not transparent for the light of the subjacent flat capacitor 4 through 7, for example aluminum, which is stuck by means of an adhesive layer (not shown) on to the top side of the transparent cover layer 7 or laminated thereon in some other fashion.

In order here to reduce in the required fashion the initially very high reflectance of the reflection film 10', which is above the statutory limit value, the reflection film 10' is provided with a grid raster of through holes 19, that is to say holes which extend through all layers 14 through 16, only some of the holes being shown in FIG. 3. The diameter and the surface density of the holes 19 are on the one hand so selected that the reflectance of the reflection film 10' is reduced in the required fashion and at the same time sufficient light can issue from the flat capacitor 4 through 7 forwardly (that is to say upwardly in the Figures) in order to satisfy the statutory requirements in regard to the brightness of an illuminated plate, in particular a motor vehicle licence plate.

The embodiment illustrated in FIG. 4 again uses a reflection film 10 which is transparent in relation to the light of the flat capacitor 4 through 7 and from the rear side of which the prismatic structures 12 freely project. It is stuck on to the top side of the transparent cover electrode 7 with a thin adhesive layer 20 which here does not penetrate into the intermediate spaces between the prismatic structures 12. In order nonetheless to achieve the required reduction in the reflectance of the reflection film 10, those prismatic structures 12 are flattened off or rounded in such a way that, in the cross-section in FIG. 4, they are of a substantially trapezoidal configuration, whereby their surface regions permitting total reflection are reduced in size.

Flattening or rounding of the prismatic structures 12 can be effected by the film 10 being heated and pressed against a hard surface under a predetermined pressure. The extent of the flattening or rounding effect can be controlled by the level of the temperature used and/or the magnitude of the pressing pressure. It will be appreciated that, the more the prismatic structures 12 are flattened off, the greater will be the reduction in the reflectance of the film 10.

Depending on the respective nature of the reflection film used however it may also be sufficient for it just to be heated to an elevated temperature for a given period of time in order to achieve the desired flattening or rounding of the prismatic structures, without pressure having to be applied at the same time to the film or the prismatic structures.

When using other films, it may be sufficient only to exert a given pressure on the prismatic structures without in that respect specifically increasing the temperature. In this case also the period of time and the magnitude of the pressure can be employed as control parameters.

In all those cases, the operation of heating and/or pressing the film 10 can be effected either in a separate step in the process prior to the application thereof to the cover electrode 7 or a layer covering same, or during that application procedure.

All the illustrated embodiments may include additional layers, in particular protective layers for covering the outward sides, which are not shown in the Figures. As an alternative to the embodiment shown in FIG. 1 it is also possible to apply pressure to the transparent reflection film 10 in such a way that the tips of the prismatic structures which project at the rear side thereof penetratingly advance as far as the cover electrode 7 or a transparent hard layer (not shown) disposed thereover, but substantially cannot deform same, because of its hardness. In that case the thickness of the adhesive layer 9 which is completely pierced by the prismatic structures 12 is so selected that it only partially fills in respect of height the free spaces present between those prismatic structures, and thus reduces the reflectance of the reflection film 10 not completely but to the desired extent.

The measures described hereinbefore by means of the embodiments by way of example in FIGS. 1 and 2 can also be adopted in combination. It is also possible to provide adhesive layers of differing thicknesses in different surface regions, those adhesive layers filling to different heights the free spaces between the prismatic structures 12.

Another possibility involves applying the layers of the flat capacitor not under the reflection film 10 or 10' but on the top side thereof which is towards the person viewing the arrangement, in rastered form. As those layers do not transmit any light to the reflection film 10 or 10' or light reflected thereby cannot issue through the top side, a suitable choice in respect of the size and surface density of the electrically conductively interconnected raster points of the flat capacitor arrangement reduces the mean reflectance of the reflection film 10 or 10' in the desired manner and at the same time achieves the required brightness of the flat capacitor arrangement. In that case it is possible to use both completely transparent reflection films 10 and also reflection films 10' which include an opaque layer.

The invention claimed is:

1. A process for the production of a plate, in particular a motor vehicle licence plate, in which initially at least one layer sequence forming an electroluminescence flat capacitor (4, 5, 6, 7) and thereafter a reflection film (10; 10') which is translucent for the light of the electroluminescence flat capacitor (4, 5, 6, 7) are applied to a carrier (1), wherein the reflection value of the reflection film (10; 10') is higher than the maximum statutory permissible value, and said reflection value is reduced by further production steps to such an extent that it is below the maximum statutory permissible value,
   characterised
   in that a reflection film (10) is used whose reflection properties are based on it having on its rear side rearwardly projecting prismatic structures (12), at the interfaces of which the light incident from the front side is reflected by total reflection, and that the further production steps involve applying the reflection film (10) to an adhesive layer (9) which is translucent in respect of the light of the electroluminescence flat capacitor (4, 5, 6, 7) and is of approximately the same optical refractive index as the rearwardly projecting prismatic structures (12) of the reflection film (10), and
   in that situation the intermediate spaces between the prismatic structures (12) are partially filled by the adhesive to such an extent that the reflection value of the reflection film (10) is reduced in the desired manner.

2. A process as set forth in claim 1, characterised in that the operation of filling the intermediate spaces between the prismatic structures by the adhesive is partially effected in respect of height by a procedure whereby the pressing pressure of the reflection film (10) and the viscosity of the adhesive at the time of pressing the reflection film (10) are so selected that the prismatic structures (12) which project on the rear side of the reflection film (10) penetrate into the adhesive only to such a depth that the total reflection which is reduced in the regions embedded in the adhesive reduces the reflection value of the reflection film (10) in the desired fashion.

3. A process as set forth in claim 1, characterised in that filling of the intermediate spaces between the prismatic structures (12) by the adhesive is effected partially in respect of height by the adhesive being applied to a layer which is so hard that it is substantially not deformable by the prismatic structures (12) projecting from the rear side of the reflection film (10) when the reflection film produced is subjected to pressure and by the thickness of the adhesive layer being so selected that the prismatic structures (12) which project on the rear side of the reflection film (10) and which when pressure is applied to the reflection film (10) penetrate with their tips as far as the hard layer engage into the adhesive only to such a depth that the total reflection which is reduced in the regions embedded in the adhesive reduces the reflection value of the reflection film (10) in the desired manner.

4. A process as set forth in claim 1, characterised in that filling of the intermediate spaces between the prismatic structures (12) by the adhesive is effected partially in respect of surface area in that, in surface regions disposed in mutually juxtaposed raster-like relationship, the intermediate spaces between the prismatic structures (12) are filled to differing heights so that the reflection value of the reflection film (10), which is averaged in respect of surface area, is below the maximum value permitted by statute.

5. A process as set forth in claim 4, characterised in that in first surface regions the intermediate spaces between the prismatic structures (12) are filled completely in respect of height by the adhesive while in the interposed second surface regions there is no filling of the intermediate spaces by the adhesive.

6. A process as set forth in claim 2, characterised in that filling of the intermediate spaces between the prismatic structures (12) by the adhesive is effected partially both in respect of height and also in respect of surface area.

7. A plate, in particular a motor vehicle licence plate, which includes a carrier (1), a reflection film (10; 10') and at least one layer sequence which as seen from the viewer is disposed behind the reflection film (10') and which forms an electroluminescence flat capacitor (4, 5, 6, 7), wherein the reflectance, which is originally above the maximum value permitted by statute of the reflection film (10; 10') which is translucent for the light of the electroluminescence flat capacitor (4, 5, 6, 7), has been reduced in the course of the plate production process, characterised in that prismatic structures (12) which project from the rear side of the reflection film (10) and at the interfaces of which the light incident from the front side is reflected by total reflection are partially embedded into a transparent layer (9) having approximately the same refractive index as the prismatic structures (12), in such a way as to afford a reduced total reflectance.

8. A plate as set forth in claim 7, characterised in that partial embedding is based on the fact that the prismatic structures (12) are not engaged over their entire height into the transparent layer (9) having approximately the same refractive index.

9. A plate as set forth in claim 7, characterised in that the prismatic structures (12) in differing surface regions of the flat side of the plate are engaged to differing depths into the transparent layer (9) having substantially the same refractive index.

10. A plate as set forth in claim 9, characterised in that in first surface regions of the flat side of the plate the prismatic structures (12) are engaged with their entire height into a transparent layer (9) having substantially the same refractive index and in second surface regions they are not engaged into such a layer.

11. A plate as set forth in claim 7, characterised in that the layer (9) having substantially the same refractive index is an adhesive layer which serves at the same time for fixing the reflection film (10) on the layer therebeneath.

* * * * *